United States Patent [19]

Hultman

[11] Patent Number: 4,652,863
[45] Date of Patent: Mar. 24, 1987

[54] DISARMABLE MAGNETIC ANTI-SHOPLIFTING MARKER

[75] Inventor: Bo-Göran Hultman, Onsala, Sweden

[73] Assignee: Antonson-Avery AB, Vastra Frolunda, Sweden

[21] Appl. No.: 758,669

[22] PCT Filed: Nov. 9, 1984

[86] PCT No.: PCT/SE84/00381
§ 371 Date: Jul. 10, 1985
§ 102(e) Date: Jul. 10, 1985

[87] PCT Pub. No.: WO85/02285
PCT Pub. Date: May 23, 1985

[30] Foreign Application Priority Data

Nov. 11, 1983 [SE] Sweden ................... 8306208

[51] Int. Cl.⁴ .................................... G08B 13/24
[52] U.S. Cl. ............................... 340/551; 340/572
[58] Field of Search ............................ 340/551, 572

[56] References Cited

U.S. PATENT DOCUMENTS 4,539,558  9/1985  Fearon .................... 340/572
4,568,921  2/1986  Pokelsky ................. 340/551

Primary Examiner—Glen R. Swann, III
Attorney, Agent, or Firm—Harness, Dickey & Pierce

[57] ABSTRACT

Two strips (ribbons of foil) are positioned underneath a label on an article. Upon purchase of the article a magnetizing means with two spaced apart magnets provided thereon is passed across the strips in the transverse direction of the latter. One of the strips is of a ferromagnetic hard material and then will be magnetized with a number of poles. The second (one of the strips is of a ferromagnetic soft material which possesses the property of generating harmonics in a magnetic field. In combination with a magnetized strip having more than two north and south poles the ferromagnetic soft material will, however, be magnetically saturated so that harmonics will not be generated.

In a sensing zone including magnetic fields the ability of the strips to generate harmonics is detected. If such harmonics are generated, the alarm is activated.

3 Claims, 4 Drawing Figures

DISARMABLE MAGNETIC ANTI-SHOPLIFTING MARKER

BACKGROUND OF THE INVENTION

The subject invention concerns a device in an alarm system and is designed to sense the entrance of an article equipped with a particular marker into a magnetic field generated for the purpose of this sensing operation. The marker comprises at least one strip of a material having ferromagnetic soft properties and sensing means are provided to sense the characteristic tones generated by the ferromagnetic soft strip material in the magnetic field. Adjacent each strip of ferromagnetic soft material there is arranged a second strip of a material having properties allowing it to be magnetized but which material is non-magnetized in its untreated state. A means is designed to neutralize the marker, ensuring that the alarm remains inactivated when the marker passes through the magnetic field. The device is intended for use in alarm systems in in retail stores, libraries and similar premises to prevent shop-lifting and thefts.

Shoplifting and thefts from shops and stores are quite common. The waste in shops and stores in Sweden is estimated to quite considerable amounts per household and year. The shoplifting may be of an unplanned and impulsive type but also be well-planned and carried out on a large scale.

Alarm devices of the type defined in the introduction are well known and used in various applications. These alarm devices are designed to make use of the fact that when a piece of metal (preferably of a so-called high-permeability material) enters a sinusoidally varied magnetic field a voltage is induced in coils arranged in the vicinity of the applied magnetic field. Each metal which enters the magnetic field generates a voltage which is characteristic of that metal. This voltage consists of a basic component and a number of characteristic harmonics. In alarm devices of the kind described above the harmonics generated by a particular material included in the marker of an article alerts the alarm. An alarm device functioning in accordance with this principle is described in FR No. 763 681.

In GB No. 1 538 385 is described an example of an alarm device functioning on a somewhat different principle from the one described above. Two magnetic fields are established at the exit from a shop or similar premises. These two magnetic fields oscillate at different frequencies and when a marker including ferromagnetic soft material is introduced into these magnetic fields it will give off a tone of a frequency representing the difference between the frequencies with which the two magnetic fields oscillate. Sensing means are set to detect the tones of this frequency and upon detection thereof trigger off the alarm.

SUMMARY OF THE INVENTION

The purpose of the subject invention is to provide an alarm device in which in a simple and efficient manner the characteristics of the marker may be altered in such a manner that it may be neutralized and be passed through the magnetic field without triggering off the alarm. This is achieved in the alarm device in accordance with the invention therein that the second strip is a continuous strip which is sufficiently thin to allow lasting magnetic poles which are limited as to their extension in the lengthwise direction of the second strip, to generate irrespective of the cross-sectional profile configuration of the second strip, that said neutralization means is arranged, upon said neutralization, to magnetize the second strip in such a manner that the latter will comprise a number of magnetic poles of limited extension, whereby the ferromagnetic soft strip becomes magnetically saturated.

BRIEF DESCRIPTION OF THE DRAWINGS

The invention will be described in closer detail in the following with reference to the accompanying drawings, wherein.

DETAILED DESCRIPTION OF A PREFERRED EMBODIMENT

Figure 1:
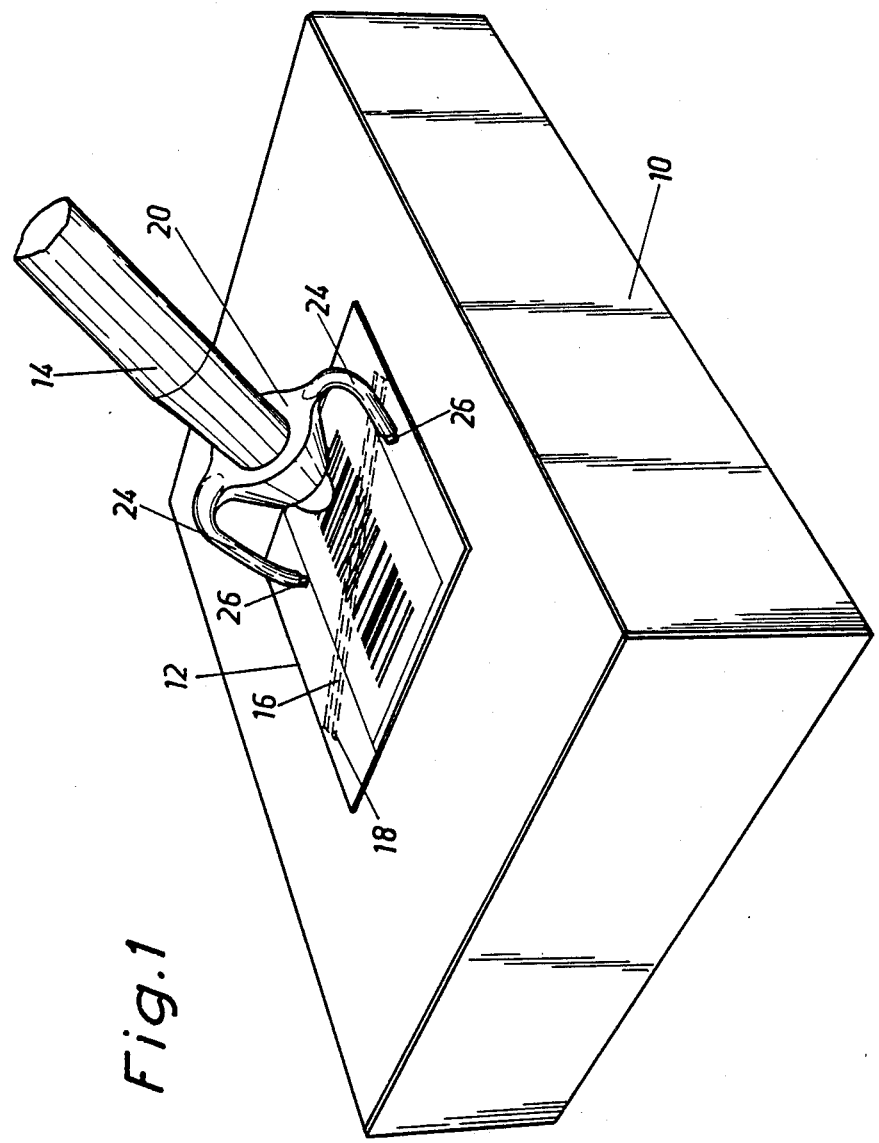
FIG. 1 is a perspective view of an article which is provided with a marker for activation of the alarm, in the form of a label.

Several examples of the alarm device in accordance with the invention for alarm systems will be described in the following for use in retail stores to prevent shoplifting but a number of other applications obviously are possible.

An article 10 is provided with a label 12. The latter may, as shown, be provided with an EAN Code i.e. European Article Numbering Code (so-called rib code). Codes of this kind are well known and in general use. The code is read by means of a read pen 14 which is passed across the code in the lengthwise direction thereof across the ribs.

On its lower face the label 12 is provided with two strips (ribbons of foil), a narrower strip 16 and a wider strip 18. The narrower one of the strips is of a ferromagnetic soft material which possesses the properties of having a high permeability, being non-magnetized in itself and being incapable of being magnetized but conducts magnetism well. The broader strip 18 is of a ferromagnetic hard material (such as iron) having the property of being non-magnetized when untreated but being magnetizable.

Figure 2:
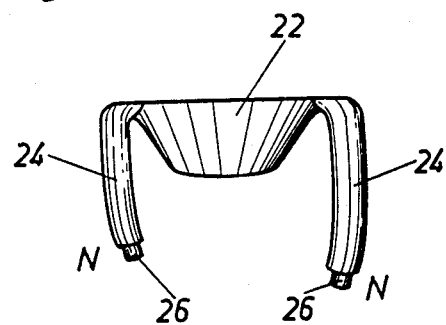
FIG. 2 is a detail view from the side of a means designed to neutralize the marker.

The alarm device in accordance with the invention comprises a magnetizing means 20 which is designed for being mounted on the read pen 14. For this purpose it is provided with a centre part 22 having an aperture formed therein (FIG. 2). From the centre part project two arms 24, each one carrying at its outer end a small magnet 26 (see FIG. 2). Both magnets 26 have the north pole facing downwards. One of the arms is slightly longer than the other one to compensate for the normally tilted position of the pen.

The alarm device also has a magnetic field which is established in a conventional and prior-art manner in a sensing zone close to the store exit. This is not illustrated in the drawings but its function in the inventive object is in principle identical to that of prior-art technology devices.

The alarm device in accordance with the invention operates in the following manner. When the strip 16 of ferromagnetic soft material enters a magnetic field in the sensing zone, harmonics are generated. These harmonics are detected in accordance with the invention by sensing means which may include aerials. As a result, if an article 10 carrying a non-treated label enters the magnetic field, this is detected and the alarm is triggered off.

When the article 10 is purchased the read pen 14 is passed over the EAN Code to read the price code of the article. On the read pen 14 the magnetizing means 20 is mounted. The magnets 26 thereof then are passed across the two strips 16, 18 which are arranged essentially in the transverse direction across the EAN Code (cf. FIG. 1). From a manufacturing point of view it is most simple to position the strips 16, 18 slightly diagonally across the label 12. The strip 18 will be magnetically charged in the manner appearing from FIG. 4. Two north poles and three south poles are clearly distinguishable in the strip 18. The effect of the magnetizing condition is magnetic saturation of the ferromagnetic soft material and consequently the latter can no longer generate harmonics in a magnetic field. As a result, no alarm will be triggered off when the article enters the magnetic detection field. The magnetized strip 18 could be said to "blot out" the strip 16 by interference.

As illustrated in the drawings, this strip preferably is continuous and has a uniform profile configuration. In this way, the strip may be manufactured in a more simple and efficient manner that is the case with corresponding prior-art elements of ferromagnetic hard materials.

In order to achieve the desired properties of the label 12 the proportions between the ferromagnetic soft and the ferromagnetic hard materials should be such as to ensure that at least 60% of the total mass is constituted by ferromagnetic hard material.

Figure 4:
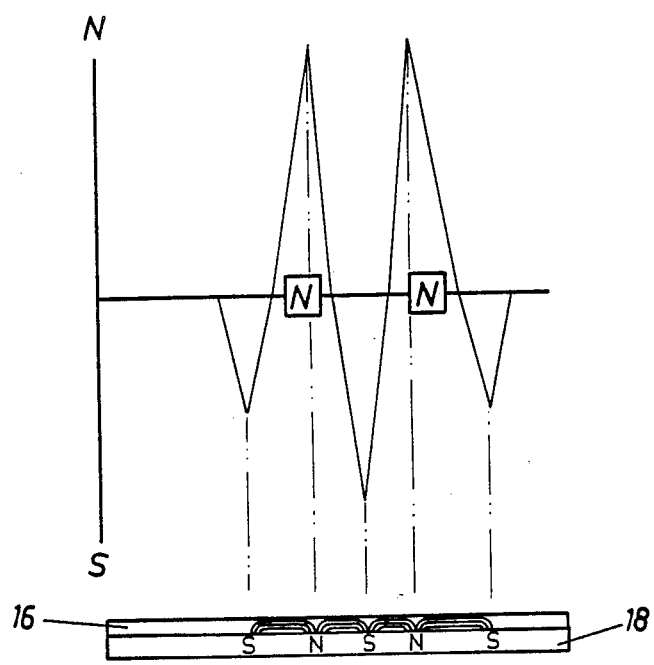
FIG. 3 is an explosive view of the parts forming a label in accordance with the invention and FIG. 4 illustrates schematically the magnetic charge distribution over the strips incorporated in the label after the neutralization of the latter.
Figure 3:
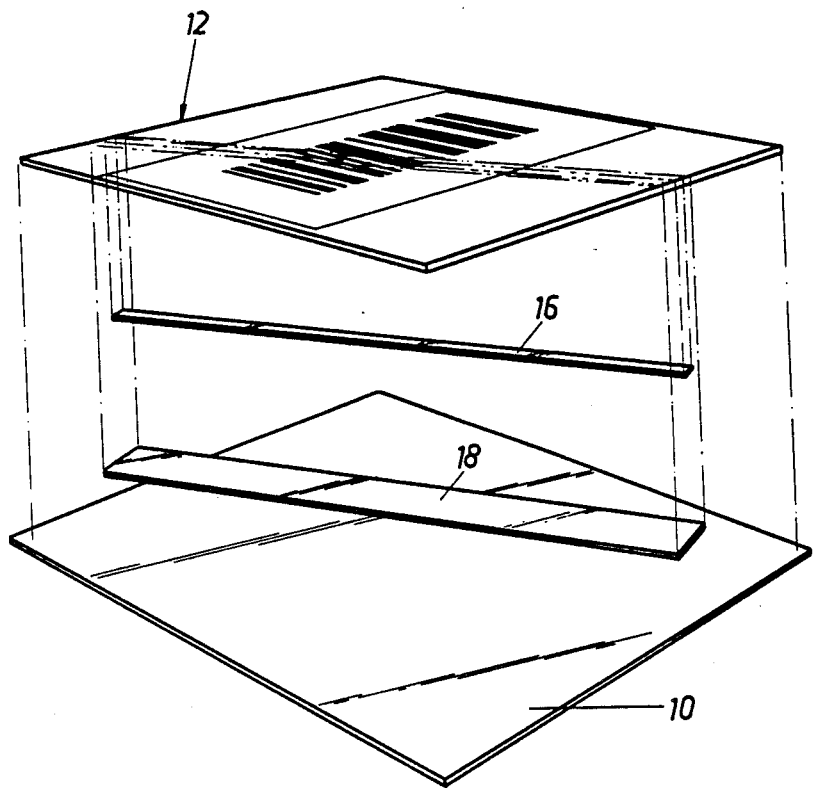

The ferromagnetic hard strip 18 is thin with the result that it may exhibit evident localized poles (see FIG. 4). It is also possible and advantageous to form more poles than the number shown in FIG. 4.

A number of advantages are obtained in the device in accordance with the invention compared with corresponding devices of prior-art technique. The strips 16, 18 are sufficiently thin to eliminate the possibility that their presence underneath the label 12 could be detected by touch. In this way would-be shoplifters cannot possibly determine which articles are provided with labels of the kind capable of triggering off the alarm.

A further advantage inherent in the alarm device in accordance with the invention is that several smaller and less strong magnets 26 are used instead of one comparatively strong magnet, as is the case in prior-art technology devices. In accordance with the prior art the magnet often is mounted at the cash-register desk in the shop. The article is passed across this magnet to neutralize the marker. Articles such as videotapes and the like may be damaged by a strong magnet. Account cards or equivalent items, if carelessly thrown onto the cash-register desk, could by mistake end up on the magnet and be ruined. The smaller and less strong magnets used in the device in accordance with the invention generate weaker magnetic fields with consequential reduction of this type of risk.

The embodiment of the invention described in the aforegoing is to be regarded as an example only and a variety of different embodiments are possible within the scope of the appended claims. The alarm device need not be combined with the use of EAN Codes but the magnetizing step upon payment could be effected in other ways, such as by means of a separate magnetizing means or by passing the article across magnets positioned in the cash-register desk. Likewise, the shown combination of two north poles 26 which are passed across the strips 16, 18 in spaced relationship is not either the only possible alternative although one that has proved suitable and purposeful. Any one combination of two or several poles is possible per se.

The device in accordance with the invention could be adapted to its intended usage and point of application. The longer the strip 16 the more efficiently it may be detected. A comparatively long strip 16 may require a larger number of poles in the strip 18 than the number shown.

What I claim is:

1. An improved alarm system comprising a sensing zone in which a magnetic field is generated, a read member and a particular marker, the system being designed to sense the entrance of an article equipped with said marker into the magnetic field, the magnetic field being generated for such a sensing operation, said marker comprising at least one first strip of a material having ferromagnetic soft properties such that said ferromagnetic soft strip generates characteristic frequencies in the magnetic field, sensing means being provided in the sensing zone to detect said characteristic frequencies in the generated magnetic field, a second strip arranged in said marker adjacent each said first strip of ferromagnetic soft material, said second strip consisting of a material having properties allowing it to be magnetized but being non-magnetized in its untreated state, said read member comprising a means designed to neutralize said marker for ensuring that the alarm remains unactivated upon passage of said marker through the magnetic field, said second strip being a continuous strip which is sufficiently thin to allow generation of lasting magnetic poles regardless of the cross-sectional profile configuration of said second strip, said lasting magnetic poles being limited as to their extension in the lengthwise direction of said second strip, said neutralizing means being arranged to magnetize said second strip in such a manner that the latter will comprise a number of magnetic poles of limited extension for magnetically saturating said ferromagnetic soft strip.

2. An improved alarm system as claimed in claim 1 wherein said second strip constitutes at least 60% of the total mass of said first and second strips.

3. An alarm device as claimed in claim 1, wherein said means for the magnetization of said second strip comprises at least two magnets, said magnets being spaced a predetermined distance apart and arranged to be passed across said first and second strips in the transverse direction thereof.

* * * * *